(No Model.) 2 Sheets—Sheet 1.

J. A. SANFORD.
LAWN MOWER.

No. 245,225. Patented Aug. 2, 1881.

Witnesses:
W. B. Marrow.
J. S. Barker.

Inventor:
James A. Sanford
by Doubleday and Bliss
attys.

(No Model.)  2 Sheets—Sheet 2.
J. A. SANFORD.
LAWN MOWER.
No. 245,225. Patented Aug. 2, 1881.
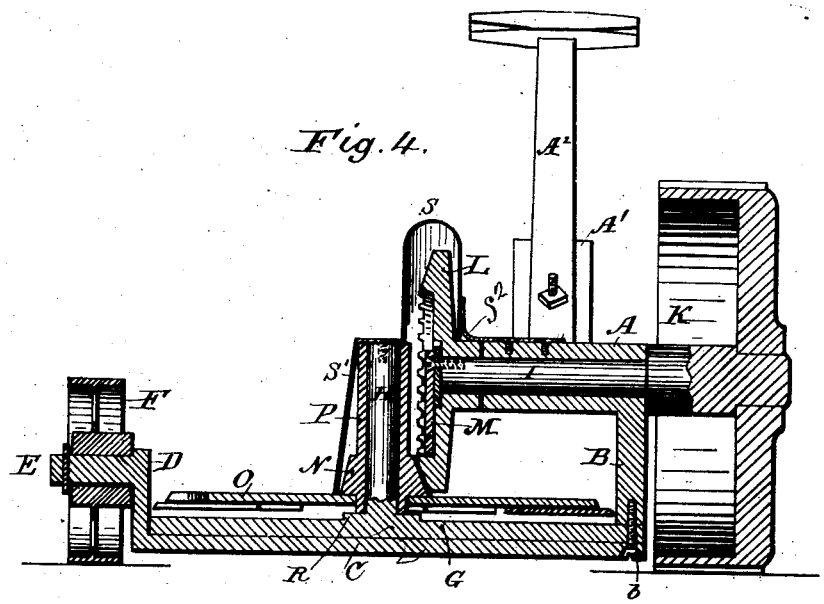
Witnesses:
W. B. Masson.
J. S. Barker.
Inventor:
James A. Sanford
by Doubleday and Bliss
attys

UNITED STATES PATENT OFFICE.

JAMES A. SANFORD, OF JACKSON, MICHIGAN, ASSIGNOR OF ONE-HALF TO JACOB LUTHER, OF SAME PLACE.

LAWN-MOWER.

SPECIFICATION forming part of Letters Patent No. 245,225, dated August 2, 1881.

Application filed February 26, 1881. (No model.)

*To all whom it may concern:*

Be it known that I, JAMES A. SANFORD, a citizen of the United States, residing at Jackson, in the county of Jackson and State of Michigan, have invented certain new and useful Improvements in Lawn-Mowers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
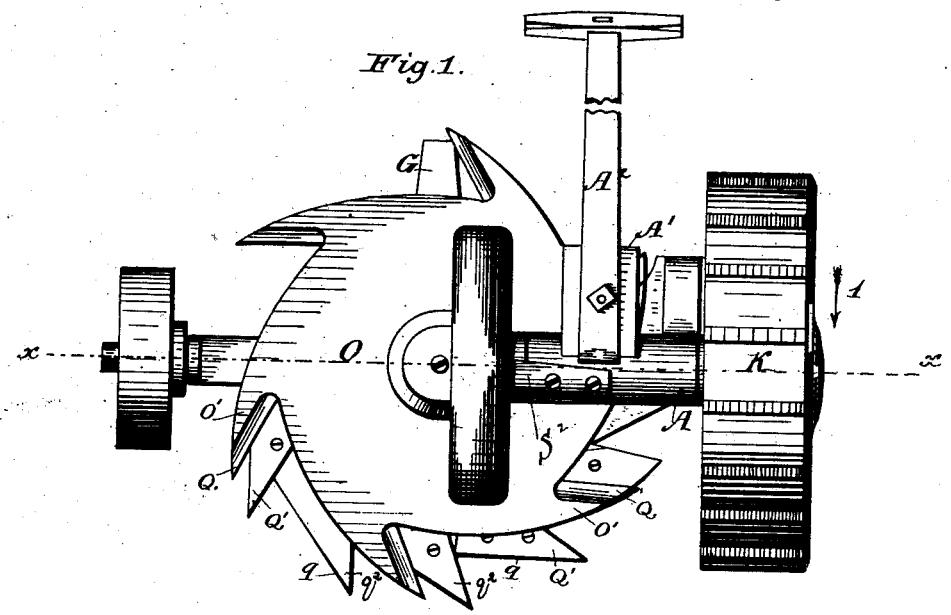
Figure 2:
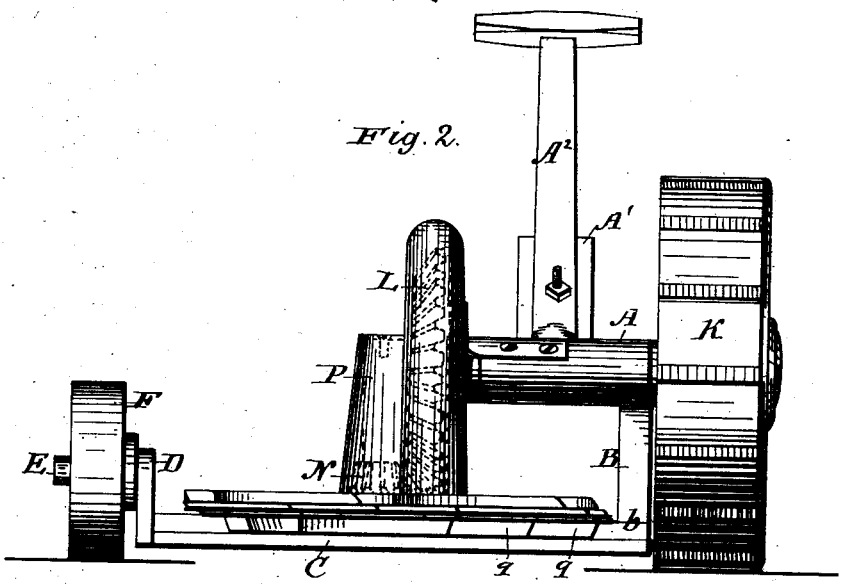
Figure 3:
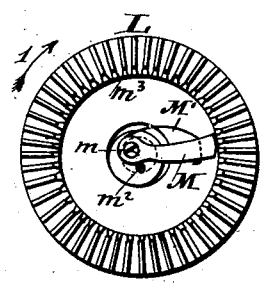

Figure 1 is a top-plan view of my improved lawn-mower. Fig. 2 is a front view. Fig. 3 is a view of the main gear-wheel and of the dog combined therewith. Fig. 4 is a vertical section on line $xx$, Fig. 1. Fig. 5 is a bottom view of one of the rotating cutters or knives on an enlarged scale. Fig. 6 is a cross-section thereof. Fig. 7 is a top view of one of the stationary knives on an enlarged scale, and Fig. 8 is a cross-section of the last-said knife.

The frame of the machine is made in two parts, which are made separable and arranged, as shown, so that the parts of the mower can be manipulated with great convenience when it is to be cleaned or repaired or the knives are to be sharpened. One part of this frame consists of a sleeve or tubular bearing, A, and a standard, B, preferably cast in one piece with the sleeve A. The other part of the frame consists of a bar, C, and an upright, D. The upright D has a stud-axle, E, projecting outwardly therefrom, adapted to receive the caster-wheel F. This wheel F operates as a support for the outer side of the machine, after the manner of a shoe, the wheel, however, being preferable under ordinary circumstances.

G is a plate attached to the bar C, and H is a vertical shaft rising therefrom. If desired, the bar C and the plate G may be formed in one piece.

The two parts of the frame are bolted together at $b$.

A' is a box or seat cast with the sleeve A and adapted to receive the handle A², by which latter the machine is propelled.

I represents the main shaft of the machine. It is mounted in the sleeve A. At the outer end it is rigidly attached to the ground-wheel K, which imparts motion to the cutters. Upon the inner end of the shaft a gear-wheel, L, is mounted loosely. When the machine is going forward the gear-wheel is engaged with the shaft by means of a friction-dog, M; but when the machine is going backward the gear-wheel is stationary. Said dog is arranged to operate as follows: It is pivoted at $m$ at a point away from the center of the wheel and of the shaft I. M' is a bent spring, one end of which is attached to the dog and the other end of which is attached to a pin or stud, $m^2$, projecting from the shaft I. The dog and spring are seated in a circular recess formed in the inner face of the wheel. When the shaft is rotating in the direction of the arrow 1 the dog is forced longitudinally outward against the wall $m^3$, and the wheel is engaged with the shaft so long as the latter revolves in this direction. If the shaft be rotated in the opposite direction the dog is drawn longitudinally away from the wall $m^3$ until it is disengaged from the wheel, which remains stationary till the shaft is again rotated in the opposite direction. The spring retains the dog in proper position to engage with the wheel at the right time.

The gear-wheel L meshes with a pinion, N, which is attached to or formed with the cutter-wheel O and with a vertical sleeve, P. Said sleeve is mounted on the shaft H and extends to the top thereof. The wheel O is formed with spurs O', projecting from its periphery, and the blades Q Q are secured to the under faces of said spurs.

The rotating knives or cutter-blades are of the shape shown in Figs. 5 and 6, and the stationary blades are of the character shown in Figs. 7 and 8. The stationary blades Q' Q' are carried by the plate G. These blades, however, are not absolutely necessary, as the plate G is itself constructed with a series of shear-edges at $q\ q$, which can be used, in conjunction with the rotating blades, for the cutting of grass. Owing to the peculiar construction of both the upper and the lower blades no adjustment thereof is needed, as they will be in substantially proper working position as soon as they are secured in place.

R is an annular support for the revolving cutter-wheel placed around the shaft H. It may be made removable, so that when the toothed plate G is employed without cutters the cutter-wheel may move in close contact therewith.

The blades Q' are arranged to have the longer edge $q$ operate as the shear-edge, and when situated as shown a very few blades are required.

Heretofore the stationary knives of lawn-mowers have been so arranged as to have the cutting-edges of the several knives substantially parallel to each other. This construction and arrangement of the stationary knives avoids a uniformity of cut around the machine owing to the different angles of the cutting-edges relative to the rotary cutters. Moreover, the stationary knives, as usually shaped and arranged, project forward from the machine in such manner as to depress laterally more or less of the grass before the rotary knives can reach it, and therefore cause an unevenness of cut.

I construct the stationary knives with but one cutting-edge, and so situate and attach them that the cutting-edges shall be substantially tangential to a circle concentric with the cutter-wheel, and also so that said cutting-edges shall bear against the grass. As a result I obtain a shear-cut all around the machine, and this shear-cut is supplemented by the sickle action of the rotary knives above described, owing to the peculiar positions of the said rotary knives upon wheel O. The relation of each movable cuttting-edge to any stationary cutting-edge as it passes over it is the same as its relation to the other stationary cutting-edges as it passes over them respectively. Moreover, the knives are so formed and arranged that the non-cutting edges $q^2$ $q^2$ do not bear against the grass.

S S' is a shield arranged to serve both as a cover for the gearing and also as a tie or brace for the two parts of the frame. The part S covers the gear-wheel and extends downward to, or nearly to, the cutter-wheel. The part S' surrounds the sleeve P and pinion N. It is bolted or screwed fast to the upright shaft, and the shield is provided with the lateral extension $S^2$, by means of which it is firmly connected to the sleeve A.

The knives Q on plate O are arranged at such an angle to the radius of the wheel that the revolving wheel can be used without the lower stationary knives, Q'. The cutting-edge of each knife Q is so nearly tangential to the periphery of the wheel that the knife cuts in the manner of a sickle. When both the upper and lower sets of knives are used they produce both a sickle-cut and a shear-cut, not only in front of the machine, but also on both sides thereof. This arrangement of knives gives a uniform cut all the way round the machine.

It will be seen that the points of support for the machine are in substantially the same vertical plane, and that the cutting apparatus is arranged between the supporting-points centrally, so that the machine is not only compact, but very easily manageable, as the cutters can be elevated or depressed, and the whole machine can be turned within a very small space. The greater part of the weight of the machine is upon the side having the driving-wheel. To overcome the difficulty that would be experienced from this in propelling the machine I arrange the handle eccentrically, and am thus enabled to apply the power uniformly.

What I claim is—

1. In a lawn-mower, the combination, with a rotary cutter-wheel mounted on a vertical axis, the ground driving-wheel, and intermediate gearing, of the herein-described frame for supporting said parts, consisting of the sleeve A, standard B, bar C, plate G, upright D, and shaft E, arranged and connected substantially as set forth.

2. The combination, in a lawn-mower having a single drive-wheel, of the following elements, namely: the drive-wheel K at the side of the machine, the support F at the opposite side, the cutter-wheel O, arranged between the last said parts, with its axis in the vertical plane of the axis of the driving-wheel, the pinion N, rigidly connected to the cutter-wheel, the shaft I, secured to the drive-wheel, the gear-wheel L, mounted loosely on said shaft, the sleeve A, for supporting the shaft, and the standard B, substantially as set forth.

3. The combination, with the gearing mechanism and the separable parts of the main frame, of the shield S S' $S^2$, arranged to cover the gearing and also to secure together and brace the parts of the frame, substantially as set forth.

4. In a lawn-mower having the parts arranged substantially as hereinbefore set forth, the combination of the single drive-wheel K at one side, the support F at the opposite side, the frame suspended from said wheel and said support, the horizontally-rotating cutter-wheel O, situated between said wheel and said support, the pinion N and wheel L, having their axes in the vertical plane of the axis of the drive-wheel, the vertical stationary shaft H at the center of the cutter-wheel, the shaft I, situated between the drive-wheel and said vertical shaft H, and the handle secured to the frame of the machine between the center and the drive-wheel.

5. In a lawn-mower, the combination, with the single drive-wheel at one side of the machine, the support F at the opposite side, the rotating cutter-wheel mounted between said drive-wheel and said support on an axis in the vertical plane of the axis of the drive-wheel, gearing mechanism situated substantially as described and operated by the single drive-wheel, of the supporting-frame suspended from the axis of the drive-wheel and from the opposite support, F, as and for the purposes set forth.

6. In a lawn-mower, the herein-described mechanism for producing a sickle-cut and a shear-cut around the machine, it consisting of a series of rotary cutters and a series of stationary cutters, the latter being arranged, as set forth, to have but one edge only of each cutter of the series advance against the grass, and to have the cutting-edges of all in the series situated similarly relatively to the rotary cutters.

In testimony whereof I affix my signature in presence of two witnesses.

JAMES A. SANFORD.

Witnesses:
   MELVIN AUSTIN,
   G. F. BURTCH.